United States Patent [19]

Signoretto

[11] Patent Number: 4,567,356

[45] Date of Patent: Jan. 28, 1986

[54] PROCESS TO ESTABLISH AND CHECK THE MATCHING OF NEGATIVES AND PROCESSING ENVELOPES IN PHOTOGRAPHIC LABORATORIES

[75] Inventor: Roberto Signoretto, Olmo di Martellago, Italy

[73] Assignee: Photo Engineering International S.R.L., Venice, Italy

[21] Appl. No.: 539,420

[22] Filed: Oct. 6, 1983

[30] Foreign Application Priority Data

Sep. 29, 1983 [IT] Italy .............................. 84143 A/82

[51] Int. Cl.⁴ ............................................ G06F 15/20

[52] U.S. Cl. ................................................... 235/375

[58] Field of Search ........................................ 235/375

[56] References Cited

PUBLICATIONS

Informacion para Rotoacadado, vol. No. 11, Apr. 1982, p. 10.

*Primary Examiner*—Harold I. Pitts

*Attorney, Agent, or Firm*—Kimmel, Crowell & Weaver

[57] ABSTRACT

The process to establish and check the matching of negatives and processing envelopes in photographic laboratories foresees that in the initial phase the bar code printed on the cartridge is automatically read and machine-reproduced in a legible code on the envelope (1), and that at the end of the film handling, an automatic check is performed between the bar code (4) preprinted on the film and the code printed on the envelope and a visually displayed comparison is made on the screen between negatives and corresponding positives, as well as between envelope and film code numbers.

6 Claims, 2 Drawing Figures

Figure 1:
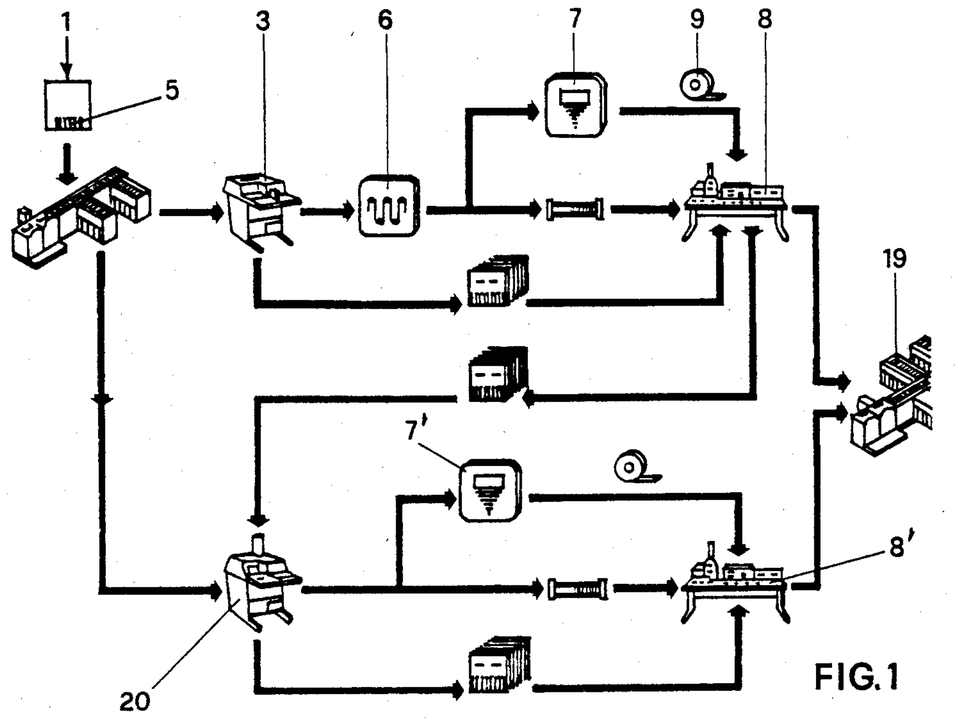

PROCESS TO ESTABLISH AND CHECK THE MATCHING OF NEGATIVES AND PROCESSING ENVELOPES IN PHOTOGRAPHIC LABORATORIES

The present invention relates to a process to establish and check the matching of negatives and processing envelopes in photographic laboratories.

Along with the development of photographic activity, photographic laboratories carrying out developing and printing of films, coming from photographic shops, have had an ever increasing expansion. In practice the customer-photographic delivers the shop the sensitized films to be developed and printed, and then the shop forwards the films, previously inserted in envelopes (called processing envelopes) to the photographic laboratory. Here the films, together with films from other shops, are extracted from the relevant cartridge, developed and printed together and then subdivided to be reinserted in their envelopes which are finally delivered back to the shops they came from.

The great problem which normally crops up in this type of process consists of returning the negatives and printed photos to the customer after these series of procedures; in other words this means to put back the negatives and positives, that match the cartridge originally inserted in the envelope by the shopkeeper, into the same envelope. Since in practice the average number of films that a laboratory processes each day runs into thousands, the problem of immediately matching film and envelope becomes one of significant importance in that if not solved, it may give way to immense drawbacks and liabilities. If a customer gets back his own negatives together with the positives of someone else there is still some bother even though it confines itself to a distribution mishap and more importantly to a loss of privacy; if moreover a negative is not at all returned to a customer it becomes extremely difficult if not impossible to correct the mishap.

At present this problem has been tackled and solved manually in practice, at the moment of the film roll extraction from the cartridge, a label with an identical countermark is applied onto the film and the envelope. In the finishing station the visual matching is then carried out between the two countermarks with all the uncertainties this operation entails, especially if the operator is worn out due to working on the same job for hours.

These drawbacks have been in part eliminated by the advent of disk films, which carry an identification number in bar code and in clear numbered code, both repeated on the film cartridge. As a matter of fact, for these films a piece of equipment has been proposed which "reads" on entry the cartridge bar code, identical to that of the film, and prints it automatically, decoded in number code on the envelope. In log out, that is after the developing operations (continuous printing and cutting paper rolls to form photographs) this well known piece of equipment carries out a visual comparison of the various elements enabling the operator to visually check that they match up. In particular, in the finishing station the disk film image is picked up on a screen enabling a visual comparison between negatives and printed photographs.

Furthermore, this film code number is also picked up on the screen and this also can be visually checked by the operator with the code previously printed in the envelope before finally putting the disk and photographs back into the envelope.

This system, which has enabled an automatic matching to be performed between disk and envelope still always requires visual checking between developed disk and envelope in the finishing station making this check rely on the operator's accuracy. Hence this is subject to errors which it may be difficult or impossible to eliminate.

According to the invention these drawbacks are eliminated with a process to establish and check matching of negatives and processing envelopes in photographic laboratories, wherein the negatives are of disk type with a bar code printed on the film and on the film cartridge and the envelopes bear printed a machine legible code, characterised in that:

the bar code printed on the film cartridge is automatically read and reproduced, at least in its most significant part, in a machine legible code on the envelope, the envelope is separated from the cartridge and the film extracted from this is dispatched to the traditional developing and printing operations, and an automatic comparison is carried out between the bar code printed on the film and the machine legible code reproduced on the envelope in the previous separation phase.

Advantageously a visual comparisons may be carried out between predetermined film frames and corresponding photographs as well as between number codes decoded by the matching machine legible codes of film and envelope.

Figure 2:
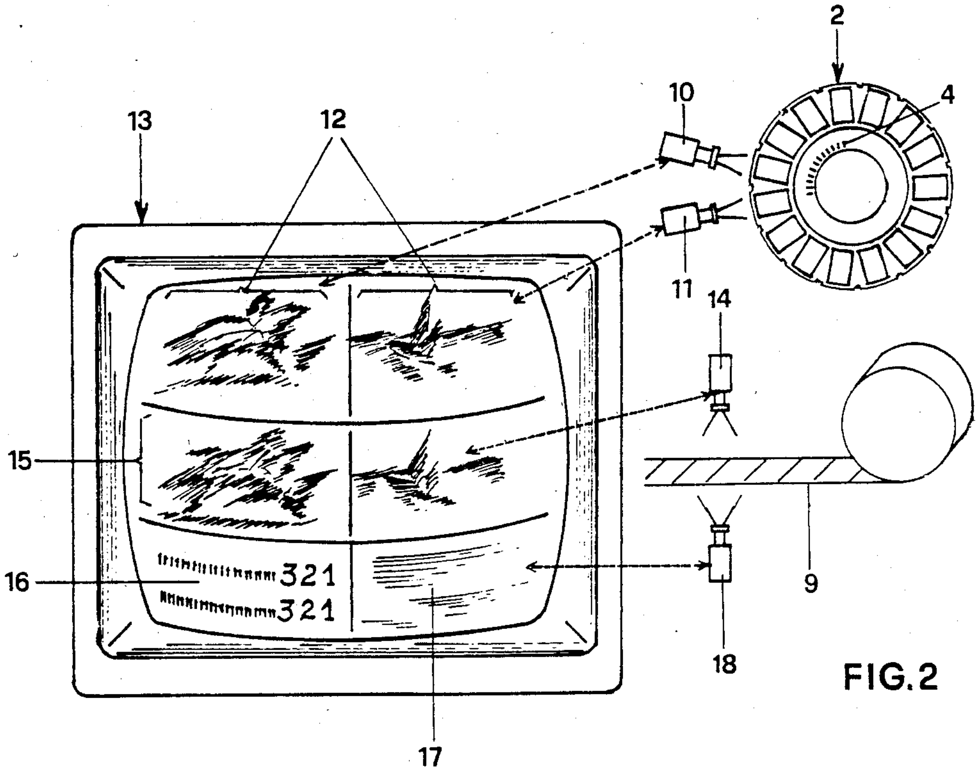

The present invention is hereinafter further described with reference to the enclosed drawings in which:

FIG. 1 shows in a schematic diagram the process according to the invention, and FIG. 2 is a detailed schematic view of the comparison phase in the finishing station.

As can be seen from the figures the process according to the invention starts when the envelope 1, coming from the photographic shop, has been laboratory sorted depending on the type of film and the processing procedure to which it has been exposed.

The envelope 1 containing the cartridge with the disk film 2, is therefore dispatched to an entry station 3. Here, after the cartridge has been extracted from the envelope 1, the bar code printed on this and corresponding to the bar code 4 on the disk 2 is automatically read and transferred automatically (bar coded and number coded) onto the envelope 1, preferably aligned with the bar code 5 already printed on it and relating to the envelope order number and to the shop identification number where it came from. This information is also sent to a central computer which records the log-in of envelopes in the laboratory and makes it possible to track the disk 2 in its various phases.

In the entry station 3 the cartridge is then opened and eliminated, while the disk 2 is removed and dispatched to conventional developing and printing stations 6 and 7.

In the meantime the envelope 1 is packed in an appropriate magazine with respect to the entry order.

After going along two different routes, in the finishing station 8 the envelope 1 and the disk 2 together with the matching prints roll 9 meet up again or at least ought to.

At this stage the bar codes on the disk 2 and the envelope 1 are read and automatically compared. At the same time two cameras 10, 11 pick up two preselected frames from the disk 2, preferably the second and third, and by magnification and eventual positive conversion reproduce them in allocated areas 12 of the TV screen 13 while another TV camera picks up the matching, or at least the supposedly matching photos from the print roll 9 and reproduces them in an area 15 of the TV screen 13, underneath the areas 12. In another area 16 of the TV screen 13 the disk number code, and the significant part of the envelope number code 1 (last three figures) also enables a redundant and visual check of the disk envelope matching. Finally in an area 17 of the TV screen 13 near to the area 16 the back side of the photo is visually reproduced by another TV camera 18.

Once the matching between the disk 2 and the envelope 1 and between the disk 2 and the prints 9 has been checked, the operator inserts the above prints and disk in their envelope 1 onto which a machine set up in this phase has performed the pricing. The envelopes with their contents return therefore to a sorting station 19 to be subdivided according to their destination.

In cases where negative reprints need to be carried out either for technical reasons (colour/density correction) or for a new customer order, the disk 2 is dispatched to a substantially similar station 20 to the log-in station 3.

In the first case, the disk arrives from the finishing station 8 with the envelope 1 in which the disk bar code 2 has already been printed, while in the second case it is printed on the envelope 1 in a similar way to that in the log-in station 3. In both cases all the information necessary for reprints or remakes are recorded o a special magnetic track: (number of frame/s, number of rrection of data).

The disks are then dispatched to the print station 7' and finally the envelopes 1 and the disks 2, after a further transportation along two different tracks, meet up again in the finishing station 8', where the same comparison operations previously described occur.

It is to be noted that the data relating to these comparison operations can be stored in the finishing stations 8,8', so that the matching up of disk-prints and that of disk-envelope can occur in different times, and this is to increase the system production speed.

From what has been said, it is clear that the process according to the invention presents numerous advantages and in particular:

it ensures precise matching of envelopes 1 and disks 2 signalling possible errors from time to time;

it ensures correct matching of the print and envelope eliminating also in this case any retransmission mishap;

it enables a very high operating speed;

it makes visual matching easy and immediate;

it enables the entire process to be run by a central computer.

I claim:

1. Process to establish and check matching of negatives and processing envelopes in photographic laboratories, wherein the negatives are of disk type with a bar code preprinted on the film and on the film cartridge, characterised in that:

the bar code printed on the film cartridge is automatically read and reproduced, at least in its significant part, in a machine legible code on the envelope (1), the envelope (1) is separated from the cartridge and the film (2), extracted from this, is dispatched to the traditional developing and printing operations, and an automatic comparison is carried out between the bar code (4) preprinted on the film (2) and the machine legible code reproduced on the envelope (1).

2. Process according to claim 1 characterised in that a visual comparison is carried out between predetermined film frames and corresponding photographs as well as between number codes, decoded by the matching machine legible codes of the film (2) and the envelope (1).

3. Process according to claim 1 characterised in that the bar code printed on the cartridge is reproduced on the envelope (1) in bar coded and numbered form.

4. Process according to claim 2, characterised in that said visual comparison includes matchings in two finishing stations (8, 8') and is performed with TV cameras (10, 11, 14, 18) whose images are reproduced in special adjacent areas (12, 15, 16, 17) of a TV screen (13).

5. Process according to claim 4 characterised in that the data to be compared are stored in TV screen unit (13) for their differred display.

6. Process according to claim 1 characterised in that, in the disk reprint phase, information for such an operation is stored on the disk.

* * * * *